United States Patent [19]

Watanuki et al.

[11] Patent Number: 4,808,891
[45] Date of Patent: Feb. 28, 1989

[54] HIGH VOLTAGE GENERATOR

[75] Inventors: Kiyoshi Watanuki, Yokohama; Kazuyoshi Takizawa, Hiratsuka, both of Japan

[73] Assignee: Hitachi, Ltd., Tokyo, Japan

[21] Appl. No.: 208,840

[22] Filed: Jun. 22, 1988

Related U.S. Application Data

[63] Continuation of Ser. No. 947,082, Dec. 29, 1986, abandoned.

[30] Foreign Application Priority Data

Dec. 27, 1985 [JP] Japan ............... 60-292609
Jun. 13, 1986 [JP] Japan ............... 61-135916

[51] Int. Cl.$^4$ ............... H01J 29/70; H01J 29/72; H01J 29/76
[52] U.S. Cl. ............... 315/411; 315/400; 315/387
[58] Field of Search ............... 315/400, 411, 387

[56] References Cited

U.S. PATENT DOCUMENTS 3,803,446  4/1974  Faglioni ............... 315/387
3,911,214 10/1975  Mitsuda ............... 315/400

FOREIGN PATENT DOCUMENTS 0157260  9/1983  Japan ............... 315/400

Primary Examiner—Theodore M. Blum
Assistant Examiner—Gregory C. Issing
Attorney, Agent, or Firm—Antonelli, Terry & Wands

[57] ABSTRACT

In a high voltage generator comprising a flyback transformer having a primary winding and a secondary winding, a horizontal deflection circuit connected to the primary winding of the flyback transformer, and a rectifier diode connected to the secondary winding of the flyback transformer, a resonance circuit including a saturable transformer and a capacitor is inserted between the primary winding of the flyback transformer and a power source, and a signal corresponding to the value of a high voltage load current is applied to a control winding of the saturable transformer. When the value of the high voltage load current is very small, the resonance circuit resonates with a higher harmonic of a flyback pulse to remove this higher harmonic component. As the value of the high voltage load current increases, the inductance value of the secondary winding of the saturable transformer changes to change the resonance frequency of the resonance circuit. As a result, the proportion of removal of the higher harmonic component decreases to increase the peak value of the high voltage thereby suppressing a voltage drop of the high voltage.

7 Claims, 4 Drawing Sheets

+B
(1100)

HIGH VOLTAGE GENERATOR

This application is a continuation of application Ser. No. 947,082, filed Dec. 29, 1986, now abandoned.

BACKGROUND OF THE INVENTION

This invention relates to an improvement in a regulation of a high voltage generated by a high voltage generator used in a picture display apparatus such as a television receiver set using a CRT for picture display.

It is necessary to apply a high voltage as high as about 25 kV to an anode of a picture tube in, for example, a television receiver set. In order to obtain such a high voltage, a flyback pulse voltage appearing in a horizontal retrace period is boosted by a flyback transformer and is then rectified by a diode rectifier.

The pulse top of the flyback pulse waveform can be broadened by selecting the inductances and arrangement of the primary and secondary windings of the flyback transformer so that an equivalent inductance and a stray capacitance of the flyback transformer are tuned with a fifth higher harmonic of the flyback pulse and superposing this fifth higher harmonic on the flyback pulse waveform. When the pulse top of the flyback pulse waveform is so broadened, the conduction angle of the diode rectifier is widened thereby improving the regulation of the high voltage applied to the anode of the picture tube.

As an example of a device which further improves the voltage regulation, U.S. Pat. No. 4,112,337 discloses a high voltage generator in which an LC parallel resonance circuit tuned with a higher harmonic of a flyback pulse is inserted in series with a primary winding of a flyback transformer. This resonance circuit attenuates the higher harmonic of the flyback pulse thereby flattening the top of the flyback pulse waveform. This pulse waveform having the flattened top is boosted by the flyback transformer and is then rectified by a diode. Therefore, the conduction angle of the diode is widened to further improve the regulation of the high voltage.

However, the LC parallel resonance circuit disclosed in the U.S. Patent cited above is still defective in that an increase in the load results in a voltage drop since the flyback pulse waveform is maintained constant regardless of any variation of the load and that the voltage decreases by an amount corresponding to the degree of attenuation of the higher harmonic by the resonance circuit.

SUMMARY OF THE INVENTION

It is a primary object of the present invention to provide a high voltage generator which operates with an improved voltage regulation characteristic.

According to the present invention which attains the above object, the resonance frequency of a higher-harmonic attenuating resonance circuit connected in series with a primary winding of a flyback transformer is changed depending on the load of the high voltage generator.

When the high voltage load current is very small, the higher-harmonic attenuating resonance circuit resonates with a higher harmonic of the flyback pulse. The higher harmonic component included in the flyback pulse waveform is removed to suppress an increase in the secondary voltage. As the high voltage load current increases, the inductance of the resonance circuit changes, and the resonance frequency also changes. As a result, the proportion of removal of the higher harmonic component gradually decreases, and the peak value of the voltage increases correspondingly so that the voltage drop can be suppressed to a minimum.

DESCRIPTION OF THE PREFERRED EMBODIMENTS

Figure 1:
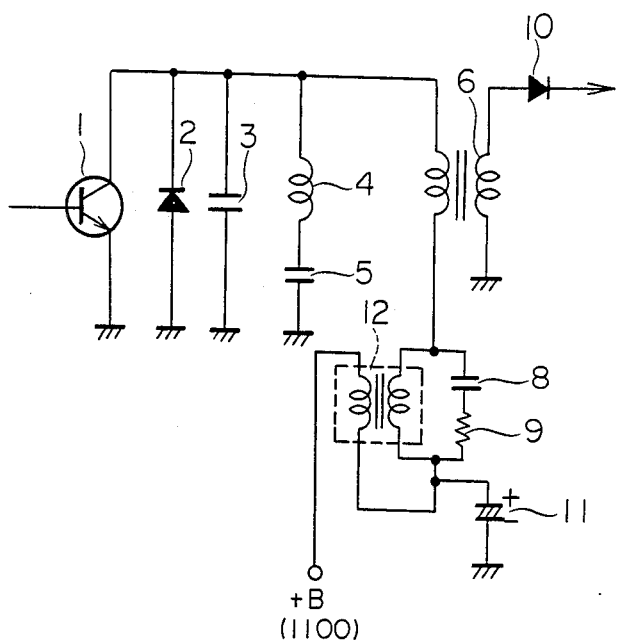
FIG. 1 is a circuit diagram showing the structure of an embodiment of the high voltage generator according to the present invention.

FIG. 1 shows a preferred embodiment of the high voltage generator according to the present invention. Referring to FIG. 1, the high voltage generator comprises a horizontal output transistor 1, a damper diode 2, a resonance capacitor 3, a horizontal deflection coil 4, an S-shape distortion compensating capacitor 5, a flyback transformer 6, a capacitor 8, a resistor 9, a high-voltage rectifying diode 10, a smoothing capacitor 11, and a saturable transformer 12. The saturable transformer 12 has its primary winding connected to a +B power source and its secondary winding connected in parallel with the capacitor 8 to constitute a higher-harmonic attenuating resonance circuit connected in series with the primary winding of the flyback transformer 6.

Figure 2:
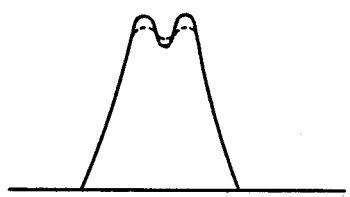
FIG. 2 shows the voltage waveform of a flyback pulse.
Figure 3:
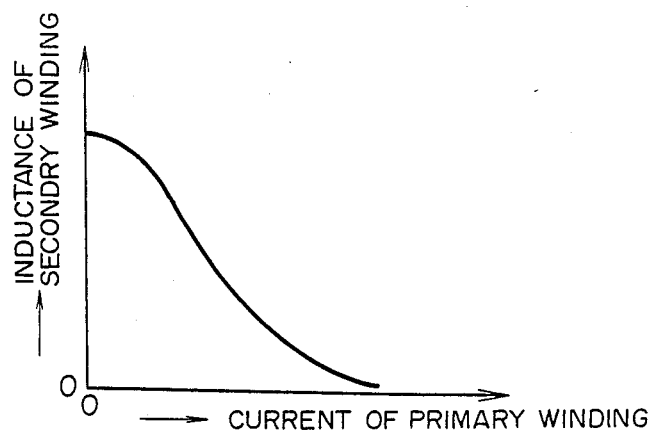
FIG. 3 is a graph showing the characteristic of the saturable transformer shown in FIG. 1.

When the flyback transformer 6 is tuned with a fifth higher harmonic of a flyback pulse, and this fifth higher harmonic is superposed on the waveform of the flyback pulse, a waveform as shown by the solid line in FIG. 2 is obtained. It will be seen that the pulse width at the pulse top is broadened so that the conduction angle of the rectifier diode 10 is widened to improve the voltage stability. As shown in FIG. 3, the value of the inductance of the secondary winding of the saturable transformer 12 decreases and increases with the increase and decrease in the value of direct current supplied to the primary winding from the +B power source. Accordingly, the resonance frequency of the resonance circuit constituted by the capacitor 8 and the secondary winding of the saturable transformer 12 increases and decreases with the increase and decrease in the value of the direct current supplied to the primary winding. The resistor 9 connected in series with the capacitor 8 is provided for damping the Q value of the resonance circuit formed by the combination of the capacitor 8 and the saturable transformer 12. This resistor 9 may be connected in parallel with the resonance circuit.

The constants of the saturable transformer 12 and capacitor 8 are determined so that the higher-harmonic attenuating resonance circuit is tuned with the fifth higher harmonic of the flyback pulse when the high voltage load current is very small. By so selecting the constants, the higher harmonic component included in the flyback pulse is attenuated by the higher-harmonic attenuating resonance circuit, and, as a result, the peak value of the high voltage appearing across the secondary winding of the flyback transformer 6 decreases as shown by the dotted line in FIG. 2. With the increase in the value of the high voltage load current, the value of the current flowing through the primary winding of the saturable transformer 12 also increases. Thus, the value of the inductance of the secondary winding of the saturable transformer 12 decreases as shown in FIG. 3, and the resonance frequency of the higher-harmonic attenuating resonance circuit becomes also higher. Therefore, the proportion of removal of the fifth higher harmonic included in the flyback pulse waveform and attenuated by the higher-harmonic attenuating resonance circuit becomes less. As a result, the high voltage appearing across the secondary winding of the flyback transformer 6 has now a waveform as shown by the solid line in FIG. 2, and the voltage drop of the high voltage is suppressed.

Figure 4:
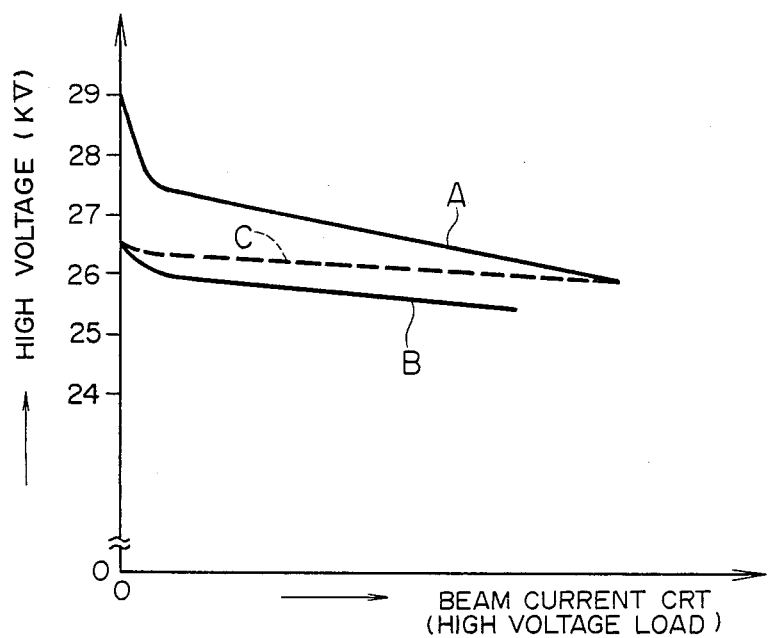
FIG. 4 is a graph showing the voltage regulation characteristic of the high voltage generator shown in FIG. 1.

In the manner described above, the peak value of the high voltage increases with the increase in the value of the load current. Thus, the high voltage regulation characteristic is greatly improved as shown in FIG. 4. FIG. 4 shows the results of an experiment conducted on various models where the capacitance value of the capacitor 8 was $C_8=0.01$ $\mu F$, the resistance value of the resistor 9 was $R_9=27\Omega$, and the inductance value of the secondary winding of the saturable transformer 12 was 68 $\mu H$ to 20 $\mu H$. In FIG. 4, the curves A, B and C represent the results when a higher-harmonic attenuating resonance circuit was not provided, the higher-harmonic attenuating resonance circuit disclosed in the aforementioned U.S. patent was provided, and the higher-harmonic attenuating resonance circuit shown in FIG. 1 was provided, respectively. According to the present invention, the high voltage regulation could be improved by a maximum of 1.5 kV as seen in FIG. 4.

As another embodiment, the saturable transformer 12 used in the embodiment shown in FIG. 1 is replaced by a self-saturating coil. Such a modification exhibits an effect similar to that exhibited by the embodiment shown in FIG. 1.

Figure 5:
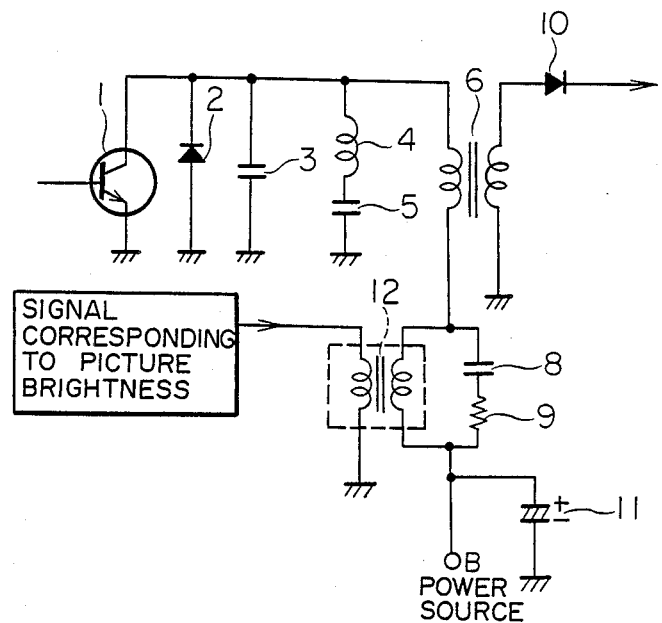
FIG. 5 is a circuit diagram showing the structure of another embodiment of the present invention.

FIG. 5 shows another embodiment of the present invention which is a partial modification of the embodiment shown in FIG. 1. Any current can be supplied to the primary winding of the saturable transformer 12, provided that it changes depending on the value of the high voltage load current. In the embodiment shown in FIG. 5, an A.B.L. (Automatic Brightness Limitation) detection voltage signal which changes depending on the value of the CRT beam current is applied to the primary winding of the saturable transformer 12 so as to exhibit an effect similar to that of the embodiment shown in FIG. 1.

Figure 6:
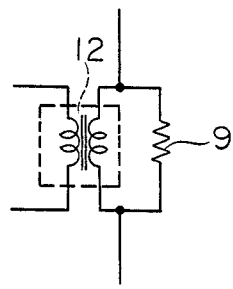
FIG. 6 is a circuit diagram showing another form of the resonance circuit.

When the present invention is applied to a flyback transformer which is tuned with a higher harmonic having a frequency higher than that of the fifth higher harmonic, the resonance frequency of the higher-harmonic attenuating resonance circuit of the present invention must be correspondingly higher, and the capacity of the capacitor 8 in the resonance circuit must be correspondingly smaller. Actually, the secondary winding of the saturable transformer 12 has a distributed capacity, and the capacitor 8 may be eliminated. Such a modification of the resonance circuit is shown in FIG. 6, and it will be seen that the resistor 9 only is connected in parallel with the primary winding of the saturable transformer 12. In such a modification, the width of a flyback pulse applied to the primary winding of the flyback transformer 6 is determined by the ratio between the inductance of the primary winding of the flyback transformer 6 and that of the secondary winding of the saturable transformer 12. When the high voltage load current is large, the inductance of the secondary winding of the saturable transformer 12 becomes correspondingly lower, and the pulse voltage appearing across the primary winding of the flyback transformer 6 is high. Thus, the high voltage regulation is improved.

Figure 7:
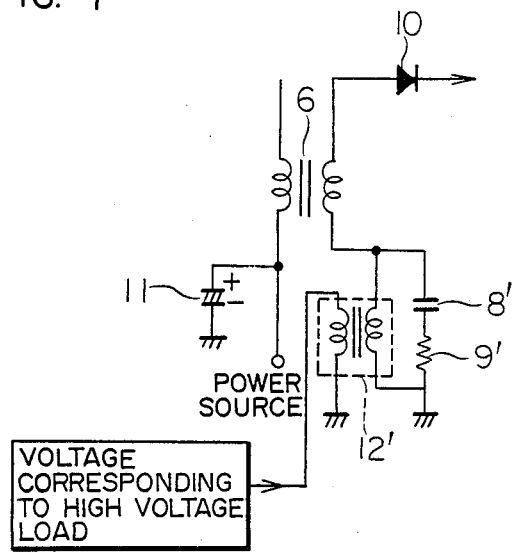
FIG. 7 is a circuit diagram showing the structure of still another embodiment of the present invention.

The foregoing description of the present invention has referred to embodiments in which a variable resonance circuit including a resistor is connected in series with a primary winding of a flyback transformer. However, in a modification, such a resonance circuit is connected in series with a secondary winding of the flyback transformer to attain the same effect as that described hereinbefore. Such a modification is shown in FIG. 7.

Figure 8:
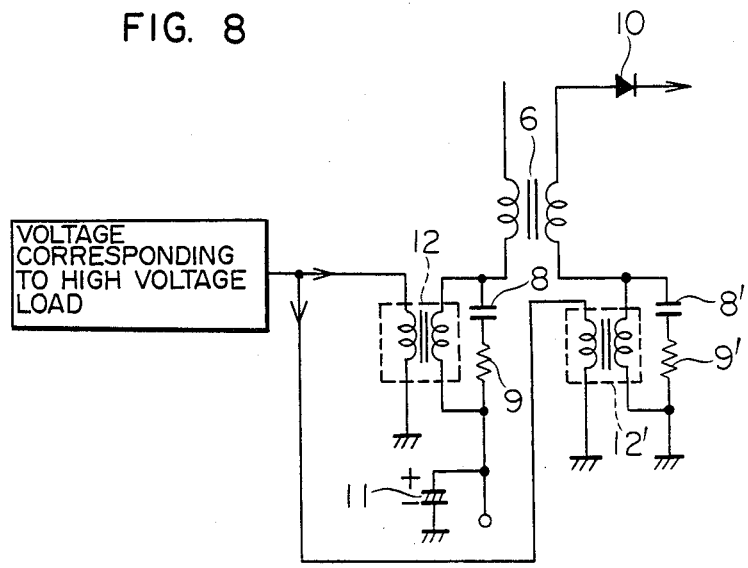
FIG. 8 is a circuit diagram showing the structure of yet another embodiment of the present invention.

In another modification, the resonance circuit of the present invention is connected in series with each of the primary and secondary windings of the flyback transformer to further enhance the effect of improving the high voltage regulation. Such a modification is shown in FIG. 8.

It will be understood from the foregoing detailed description of the present invention that, depending on an increase and a decrease of the value of a high voltage load current, the proportion of removing a higher harmonic component included in a flyback pulse applied to a primary winding of a flyback transformer is changed thereby increasing and decreasing the peak value of the high voltage pulse appearing across a secondary winding of the flyback transformer. Therefore, the present invention is advantageous in that the high voltage applied to a CRT does not substantially change regardless of variations of the value of the high voltage load current.

We claim:

1. A high voltage generator comprising a flyback transformer having a primary winding and a secondary winding, a horizontal deflection circuit connected to the primary winding of said flyback transformer and including a horizontal output transistor, a damper diode, a horizontal deflection coil and a resonance capacitor, a rectifier diode connected to the secondary winding of said flyback transformer, a resonance circuit connected in series with at least one of said primary and secondary windings of said flyback transformer and including a capacitor, a resistor and an element whose inductance value changes depending on the value of a current flowing therethrough, and control means coupled to said element for controlling said value of said current so that a resonance frequency of said resonance circuit is a harmonic frequency of a horizontal frequency when a high voltage load current rectified by said rectifier diode is near zero and increases in response to an increase of said high voltage load current.

2. A high voltage generator according to claim 1, wherein said element whose inductance value changes depending on the current value is a saturable transformer having a primary winding and a secondary winding, and said primary winding acts as a control winding.

3. A high voltage generator according to claim 2, wherein said resonance circuit is inserted between the primary winding of said flyback transformer and a power source.

4. A high voltage generator according to claim 3, wherein a current flowing through the primary winding of said flyback transformer is supplied to said saturable transformer.

5. A high voltage generator comprising a flyback transformer having a primary winding and a secondary winding, a horizontal deflection circuit connected to the primary winding of said flyback transformer and including a horizontal output transistor, a damper diode, a horizontal deflection coil and a resonance capacitor, a rectifier diode connected to the secondary winding of said flyback transformer, a resonance circuit connected to the secondary winding of said flyback transformer and including a capacitor, a resistor and an element whose inductance value changes depending on the value of a current flowing therethrough, said element comprising a saturable transformer having a primary winding and a secondary winding and the primary winding acts as a control winding, and control means coupled to said element for controlling the value of said current so that a resonance frequency of said resonance circuit is a harmonic frequency of a horizontal frequency when a high voltage load current rectified by said rectifier diode is near zero and increases in response to an increase of said high voltage load current.

6. A high voltage generator according to claim 3, wherein a signal corresponding to the brightness of a picture is applied to the control winding of said saturable transformer.

7. A high voltage generator according to claim 5, wherein a signal corresponding to the brightness of a picture is applied to the control winding of said saturable transformer.

* * * * *